(No Model.) 3 Sheets—Sheet 1.
E. B. BARKER, A. W. FOOTE & F. B. WAGNER.
FARE BOX AND REGISTER.
No. 551,884. Patented Dec. 24, 1895.
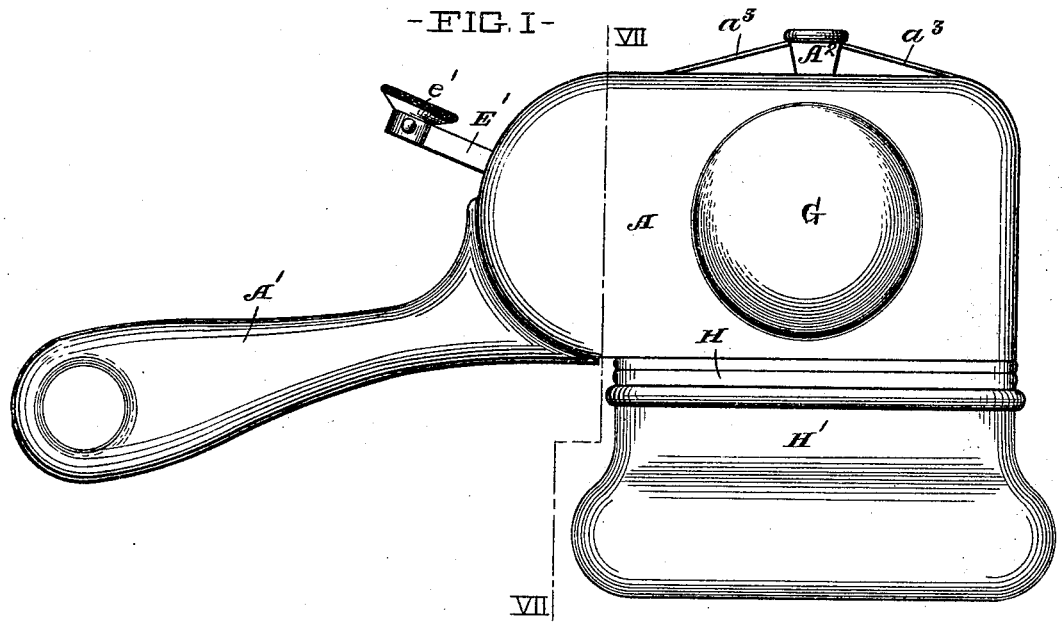
FIG. I
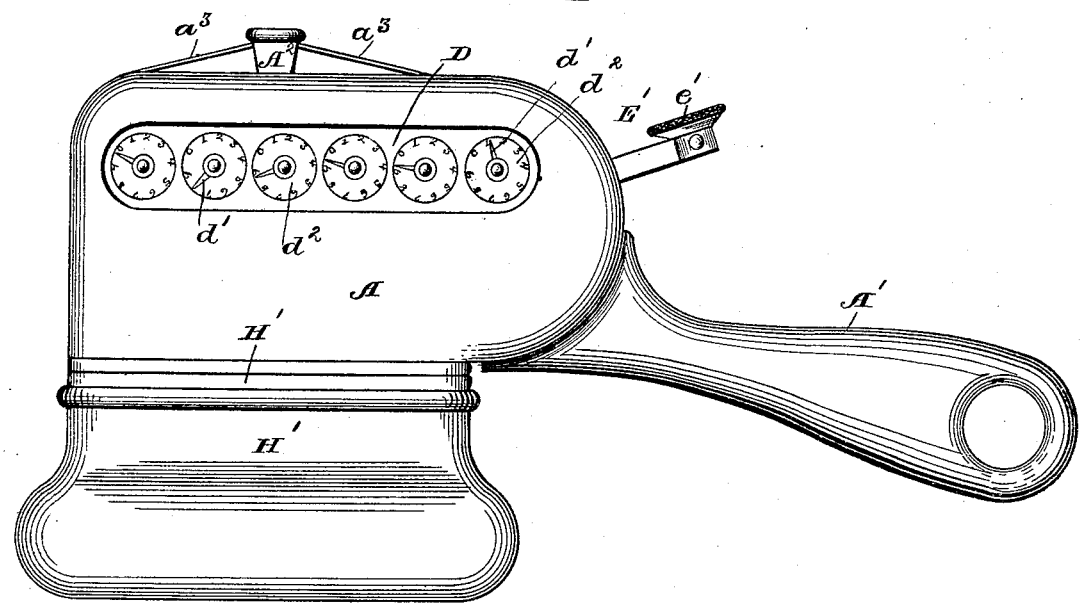
FIG. II
Witnesses,
J. C. Turner
Wm Feder
Inventors,
E. B. Barker, A. W. Foote
and F. B. Wagner,
by Hall & Fay
Attorneys (No Model.) 3 Sheets—Sheet 2.
E. B. BARKER, A. W. FOOTE & F. B. WAGNER.
FARE BOX AND REGISTER.
No. 551,884. Patented Dec. 24, 1895.
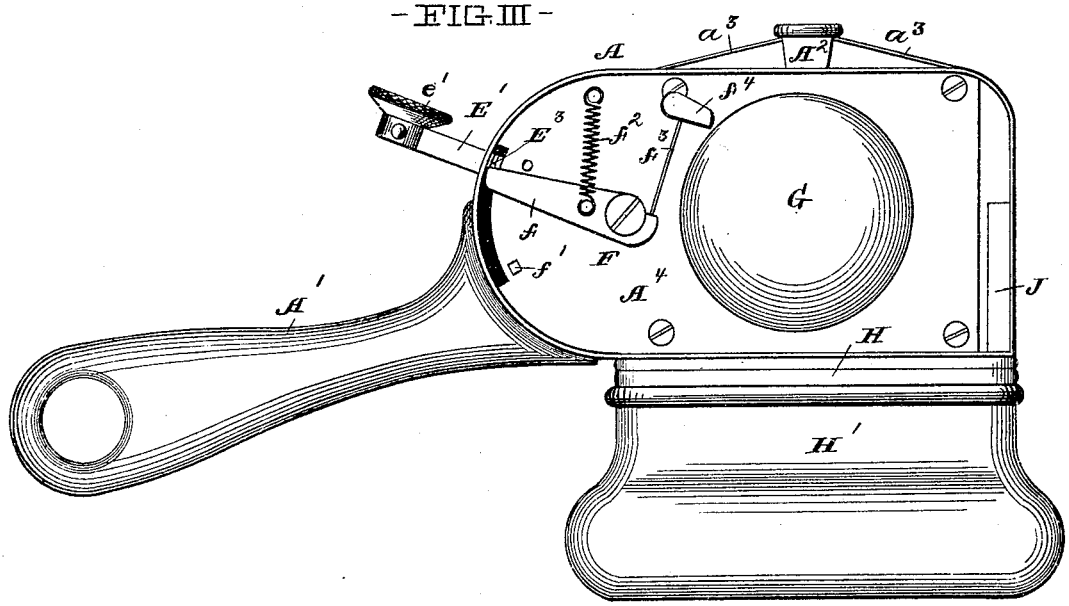
FIG. III
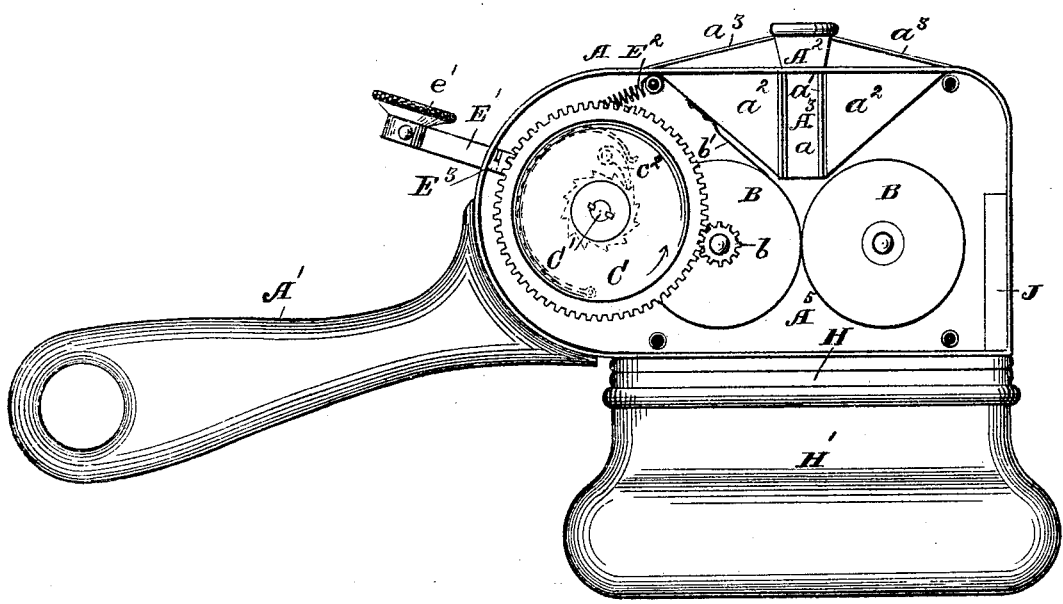
FIG. IV
Witnesses,
J. C. Turner
Wm. Lecher
Inventors,
E. B. Barker, A. W. Foote
and F. B. Wagner
by Hall & Fay
Attorneys (No Model.) 3 Sheets—Sheet 3.
E. B. BARKER, A. W. FOOTE & F. B. WAGNER.
FARE BOX AND REGISTER.
No. 551,884. Patented Dec. 24, 1895.
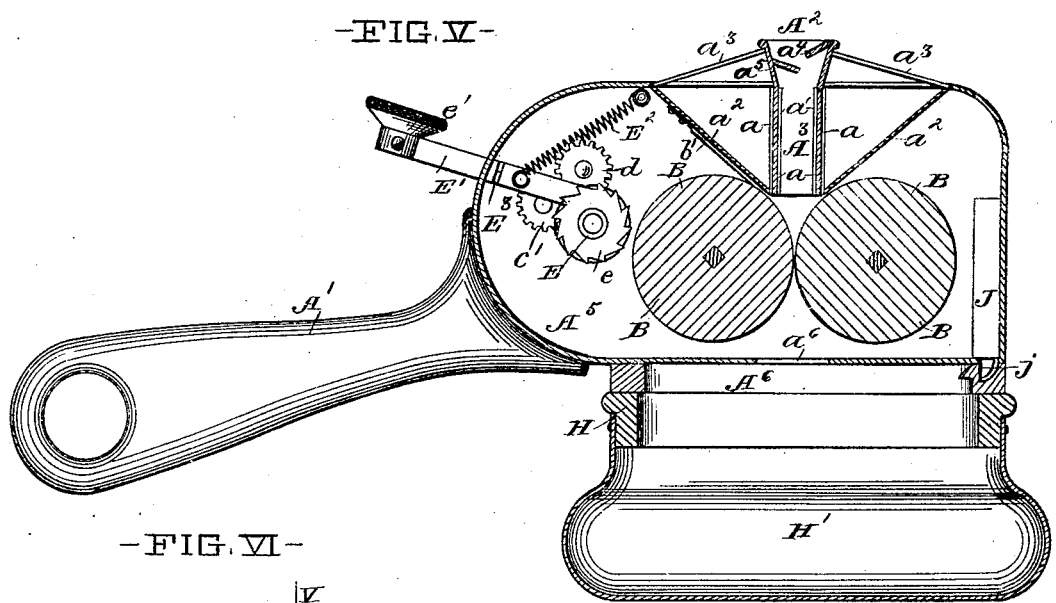
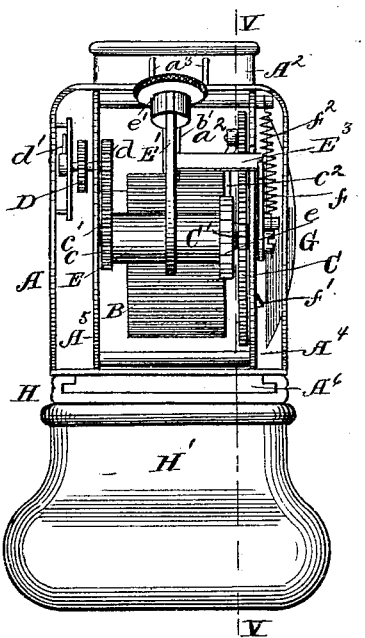
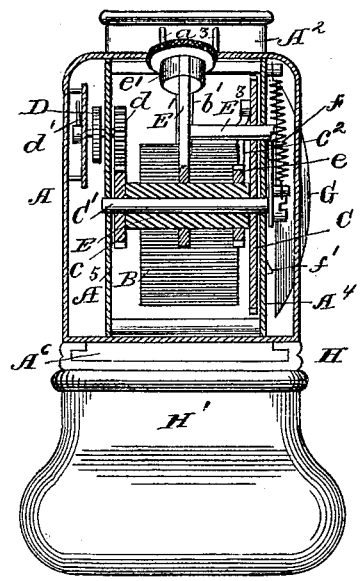
Witnesses,
Inventors,
E. B. Barker, A. W. Foote
and F. B. Wagner
by Hall & Fay
Attorneys

UNITED STATES PATENT OFFICE.

EDWARD B. BARKER, ANDREW W. FOOTE, AND FRANK B. WAGNER, OF CLEVELAND, OHIO.

FARE BOX AND REGISTER.

SPECIFICATION forming part of Letters Patent No. 551,884, dated December 24, 1895.

Application filed October 1, 1894. Serial No. 524,588. (No model.)

*To all whom it may concern:*

Be it known that we, EDWARD B. BARKER, ANDREW W. FOOTE, and FRANK B. WAGNER, citizens of the United States, and residents of Cleveland, county of Cuyahoga, and State of Ohio, have invented certain new and useful Improvements in Fare Boxes and Registers, of which the following is a specification, the principle of the invention being herein explained and the best mode in which we have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents an elevation of one side of our improved fare box and register; Fig. II, an elevation of the opposite side of the fare box and register; Fig. III, an elevation of the device with one side of the casing removed; Fig. IV, an elevation of the device with the side of the casing and the plate which supports the bell-ringing mechanism removed; Fig. V, a longitudinal section on the line V V, Fig. VI, of the device; Fig. VI, an end view of the mechanism of the device, the handle and that part of the casing to which the latter is secured being removed; and Fig. VII, a section on the line VII VII, Fig. I, illustrating the sleeve to which the trigger is secured, the register-operating shaft, and the roller-actuating cog-wheel.

An oblong nearly rectangular casing A, having a segmental end wall, incloses the registering, feeding and alarm mechanism, and a handle $A'$ is secured to the segmental end wall of the casing, so that the device may be conveniently held and presented for the collection of fares. A fare-spout $A^2$ is provided at the middle of the top of the casing and opens into a transparent fare-channel $A^3$, the sides of which are formed by two panes $a$ of glass, retained in position by ribs $a'$ upon the inner sides of two plates $A^4$ and $A^5$, which support the interior mechanism. The top of the casing is cut away at both sides of the spout, and two inclined chutes $a^2$ extend from the edges of the opening thus formed, so as to admit of inspection of the fare-channel and yet hide the interior mechanism of the device. Grates $a^3$ are preferably secured over the openings to protect the same and prevent tampering with the glass sides of the channel. Two inclined lips $a^4$ and $a^5$ are formed upon the opposite sides of the fare-spout, one below the other, and extend to a short distance from the median line of the same, so that a coin or ticket may pass unobstructed between them, but will at the same time be prevented from being shaken out of the spout after it has once been dropped into the same. Two rollers B B, of rubber or similar yielding material, or journaled in yielding bearings, and preferably formed with ribbed or otherwise roughened surfaces, are journaled beneath the lower end of the spout, so that a coin or ticket may be guided between them. The shaft of one roller has a pinion $b$, which is engaged by a cog-wheel C, secured upon a shaft $C'$, journaled in the frame-plates $A^4$ and $A^5$. Said shaft has a pinion $c$ secured upon it, which meshes with a pinion $c'$, which again meshes with a pinion $d$ upon the units-shaft of a register D, of any suitable construction and having indices $d'$ and dials $d^2$, which may be inspected through an opening in the side of the casing. Said opening may, if desired, be closed by a suitably-locked shutter to prevent unauthorized inspection; but the drawings show the opening uncovered, as the mode of attachment of the shutter will be within the province of any mechanic to construct. A sleeve E fits to turn upon the shaft, and has a ratchet-wheel $e$ upon one end, at the side of the cog-wheel C, and engaged by a spring-pawl $c^2$ upon the inner face of said cog-wheel. By this pawl-and-ratchet device the cog-wheel may be rotated in one direction by rocking the sleeve and ratchet-wheel. A trigger $E'$, having a thumb-piece $e'$ upon its outer end, is secured at its inner end to the sleeve and projects through a slot in the segmental end of the casing, so as to be readily actuated by the thumb of the hand which grasps the handle. A spring $E^2$ serves to raise the trigger and to thus return the sleeve and ratchet-wheel to their normal position after the trigger has been depressed and again released.

An arm $E^3$ projects laterally from the trigger to travel with the latter against the inner face of the segmental end of the casing, which end is concentric with the shaft and sleeve. A bell-crank F is fulcrumed concentric with the shaft and sleeve, and the outer end of the laterally-projecting arm bears against the end of one, $f$, of the arms of said bell-crank. Said arm $f$ of the bell-crank has the lower edge of its outer end curved to admit of the end of the laterally-projecting arm slipping by it when the trigger is drawn upward on its return stroke, and the arm is furthermore made with sufficient lateral spring to admit of the arm being laterally bent to slip over the end of the lateral arm when it slides over an inclined lug $f'$ upon the frame-plate at the extreme of its downstroke. A spring $f^2$ serves to quickly return the spring-arm $f$, so as to cause the other arm $f^3$ of the bell-crank, which arm has a hammer-head $f^4$, to sound a gong G, supported upon the frame-plate $A^4$ and projecting through the side of the casing. A spring-pawl $b'$ is secured to one of the chutes $a^2$, and bears with its free end against the periphery of the positively-operated roller, so as to prevent said roller from being moved backward by a pull upon a ticket partly gripped by the rollers. The under side of the casing has an opening $a^6$ below the space between the rollers, and has a laterally-flanged frame $A^6$, upon which a correspondingly-grooved frame H, to which a fare-receptacle consisting of a bag H' is secured, may be slid. A lock J has its bolt $j$ engaging the frame, so that the bag cannot be withdrawn excepting by a person possessing a key for the lock.

In practice, the fare-collector holds the device by the handle and presents it to the passenger or other person from whom fare is collected, who deposits the amount of fare, in the form of a coin or a ticket, into the fare-spout. As soon as the fare is deposited in the spout, the lips within the latter will prevent the fare from being abstracted, either by shaking the device or by inverting it, and the collector will be obliged to depress the trigger to leave a free passage for the next fare. When the trigger is depressed, the ratchet-wheel upon the trigger-sleeve will rotate the cog-wheel by engaging the spring-pawl upon the same, and the cog-wheel will rotate the rollers sufficiently to draw the largest coin or ticket which can enter the spout through the rollers and down into the bag. As the cog-wheel is rotated, the shaft of the same will rotate the register-shaft sufficiently to register one fare. The lateral arm upon the trigger will depress the arm of the bell-crank until said arm strikes the inclined lug, when said arm will be disengaged from the lateral arm and fly back by the action of its spring, striking the gong. The register will be actuated before the gong is sounded, and at the same time the fare is fed down into the bag, so that any attempt at fraud by partly depressing the trigger without sounding the alarm, for the purpose of subsequently extracting the fare from the spout, will be effectually prevented. If the person depositing the fare pays attention to the sounding of the alarm, the retention and registering of the fare will be insured. The lips in the fare-spout will practically render futile all attempts to withdraw the fare from the channel.

Although a coin representing a larger amount than the fare may be fed into the bag by registering one fare only, no fraud can be accomplished by omitting to register the entire number of fares, as the coin is in the bag, and the only result will be that the bag contains a greater amount of fares than the register indicates, which cannot be of any advantage to the fare-collector, but will rather indicate carelessness on his part.

At intervals the bag may be unlocked and either emptied or replaced by an empty bag by an authorized person having a key for the device, and the register may be inspected whenever desired. Thus, for example, on a street-car line the bag may be emptied or replaced at the end of each trip, and the register may be inspected and noted once each day.

The yielding rollers will effectually prevent all attempts to withdraw fares from the bag between the rollers and through the spout, as an instrument which will spread the rollers apart will block the passage between them, and the rollers will immediately close the gap between them when the instrument is withdrawn.

Stationary ballot or ticket receivers (the so-called "ticket-choppers") have been constructed with rollers, between which ballots or tickets might be drawn and canceled. It is, however, in the class of portable fare-receivers, to which our invention pertains, of great importance to have the feed mechanism, register and alarm so constructed that the feed of the fare and the registering of the same may be performed at the same time, and that the alarm will not be sounded until the feed and register are accomplished, thereby insuring absolute certainty that the fare is secured and registered when the alarm is sounded. It is also of great importance to the practical application of such a fare box and register that it shall be conveniently portable and capable of being actuated quickly and surely. For these reasons the trigger is placed over the handle, so that it may be actuated by the thumb, and the trigger is so connected to the feed-rollers, register and alarm that it may actuate the same quickly and surely and with slight exertion of strength.

Other modes of applying the principle of our invention may be employed for the mode herein explained. Changes may therefore be made as regards the mechanism thus disclosed, provided the principles of construction set forth respectively in the following claims are employed.

We therefore particularly point out and distinctly claim as our invention—

1. In a fare box and register, the combination of a casing having a handle projecting from one end, a fare receptacle beneath the casing, fare feeding mechanism in the casing, and a trigger for actuating said feeding mechanism, said trigger projecting out of the casing over the handle so as to be actuated by the thumb of the hand which grasps the handle, substantially as set forth.

2. In a fare box and register, the combination of a casing having a handle, a fare receptacle upon the under side of said casing, a fare spout and channel in the top of the casing, two fare feeding rollers journaled in the casing to have their touching portions in a line with the inner end of the fare channel and the entrance to the fare receptacle, a register in the casing, an alarm, and a trigger projecting over the handle and connected to simultaneously revolve a feeding roller and actuate the register and to thereupon sound the alarm, substantially as set forth.

3. In a fare box, the combination of a casing, a fare channel secured within the casing and below the top of the same and having a transparent side, means for feeding the fares from said fare channel, and an inclined chute in the top of the casing bearing against the transparent side of the channel, whereby the contents of the fare channel may be inspected from the top of the casing, substantially as set forth.

4. In a fare box and register, the combination of a fare receptacle, two rollers journaled at the entrance to said receptacle and between which the fare may be fed into said receptacle, a register, an alarm, and means for simultaneously rotating one of the rollers and actuating the register and thereupon sounding the alarm, substantially as set forth.

5. In a fare box and register, the combination of a fare channel, a fare receptacle having its entrance opposed to the inner end of the channel, two rollers journaled to have their touching portions in a line with the inner end of the fare channel and the entrance to the fare receptacle and one of said rollers having a pinion upon its shaft, a register, a shaft connected to actuate said register, a cog wheel secured upon said shaft and meshing with the pinion, a sleeve upon the shaft and provided with a trigger for rocking it, and a ratchet and pawl connection between said sleeve and the cog wheel, substantially as set forth.

In testimony that we claim the foregoing to be our invention we have hereunto set our hands this 29th day of September, A. D. 1894.

EDWARD B. BARKER.
ANDREW W. FOOTE.
FRANK B. WAGNER.

Witnesses:
  WM. SECHER,
  DAVID I. DAVIES.